US007962327B2

(12) United States Patent
Kuo et al.

(10) Patent No.: US 7,962,327 B2
(45) Date of Patent: Jun. 14, 2011

(54) PRONUNCIATION ASSESSMENT METHOD AND SYSTEM BASED ON DISTINCTIVE FEATURE ANALYSIS

(75) Inventors: Chih-Chung Kuo, Hsinchu (TW); Che-Yao Yang, Pingtung (TW); Ke-Shiu Chen, Tainan (TW); Miao-Ru Hsu, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1609 days.

(21) Appl. No.: 11/157,606

(22) Filed: Jun. 21, 2005

(65) Prior Publication Data

US 2006/0136225 A1 Jun. 22, 2006

Related U.S. Application Data

(60) Provisional application No. 60/637,075, filed on Dec. 17, 2004.

(51) Int. Cl.
*G06F 17/27* (2006.01)

(52) U.S. Cl. ................ 704/9; 704/6; 704/235; 704/257; 704/260

(58) Field of Classification Search ........................ None
See application file for complete search history.

(56) References Cited

U.S. PATENT DOCUMENTS 6,055,498 A 4/2000 Neumeyer et al. ............ 704/246
6,226,611 B1 5/2001 Neumeyer et al. ............ 704/246
6,411,932 B1 * 6/2002 Molnar et al. ................ 704/260
7,080,005 B1 * 7/2006 Kao ................................ 704/10
2003/0191645 A1 * 10/2003 Zhou ............................. 704/260
2004/0044525 A1 * 3/2004 Vinton et al. ................. 704/224
2005/0197838 A1 * 9/2005 Lin et al. ........................ 704/260
2005/0203738 A1 * 9/2005 Hwang ......................... 704/243

FOREIGN PATENT DOCUMENTS

TW 468120 12/2001
TW 556152 10/2003
TW 567450 12/2003
TW 580651 3/2004
TW 583610 4/2004

OTHER PUBLICATIONS

Chen et al., Modeling Pronunciation variation using artificial neural networks for English spontaneous speech, Apr. 2004.*
Automatic Text-Independent Pronunciation Scoring of Foreign Language Student Speech SRI, ISCSLP'96.
Automatic Pronunciation Scoring for Language Instruction SRI, ICASSP'97.

* cited by examiner

*Primary Examiner* — Leonard Saint Cyr

(57) ABSTRACT

A method and system for pronunciation assessment based on distinctive feature analysis is provided. It evaluates a user's pronunciation by one or more distinctive feature (DF) assessor. It may further construct a phone assessor with DF assessors to evaluate a user's phone pronunciation, and even construct a continuous speech pronunciation assessor with phone assessor to get the final pronunciation score for a word or a sentence. Each DF assessor further includes a feature extractor and a distinctive feature classifier, and can be realized differently. This is based on the different characteristic of the distinctive feature. A score mapper may be included to standardize the output for each DF assessor. Each speech phone can be described as a "bundle" of DFs. The invention is a novel and qualitative solution based on the DF of speech sounds for pronunciation assessment.

19 Claims, 6 Drawing Sheets

| Destinctive Feature | Classify Error Rate |
|---|---|
| syllabic | 62.04% |
| sonorant | 34.83% |
| consonantal | 14.26% |
| anterior | 59.42% |
| coronal | 22.45% |
| high | 54.46% |
| low | 65.36% |
| back | 39.86% |
| continunant | 41.89% |
| strident | 69.56% |
| delayed release | 45.83% |
| voiced | 22.48% |
| nasal | 65.31% |
| lateral | 19.28% |
| round | 25.24% |
| tense | 41.77% |
| AVG | 42.75% |

FIG. 5

| Distinctive Feature | SVM:Classify Error Rate(%) |
|---|---|
| syllabic | 29.37 |
| sonorant | 17.382 |
| consonantal | 27.06 |
| anterior | 36.59 |
| coronal | 50.51 |
| high | 31.13 |
| low | 20.02 |
| back | 49.36 |
| continunant | 33.39 |
| strident | 17.32 |
| delayed release | 36.59 |
| voiced | 19.61 |
| nasal | 30.09 |
| lateral | 9.92 |
| round | 21.51 |
| tense | 32.01 |
| AVG | 28.87 |

FIG. 6

PRONUNCIATION ASSESSMENT METHOD AND SYSTEM BASED ON DISTINCTIVE FEATURE ANALYSIS

CROSS-REFERENCE TO RELATED APPLICATIONS

This application claims priority from the following U.S. Provisional Patent Application No. 60/637,075 filed on Dec. 17, 2004.

FIELD OF THE INVENTION

The present invention generally relates to pronunciation assessment, and more specifically to a pronunciation assessment method and system based on distinctive feature (DF) analysis.

BACKGROUND OF THE INVENTION

The ability to communicate in second language is an important goal for language learners. Students working on fluency need extensive speaking opportunities to develop this skill. But students have little motivation to speak out because of their lacking of confidence due to the poor pronunciation. The intent of pronunciation assessment systems is to provide learners with diagnosis of problems and improve conversation skill. The traditional ways of computer-assisted pronunciation assessment (PA) mainly come in two approaches: text-dependent PA (TDPA) and text-independent PA (TIPA). Both approaches use the speech recognition technology to evaluate the pronunciation quality and the result is not very effective.

TDPA constrains the text for reading to pre-recorded sentences. The learner's speech input is compared to the pre-recorded speech for scoring. The scoring method usually adopts template-based speech recognition like Dynamic Time Warping (DTW). Therefore, the TDPA approach has the following disadvantages. It limits learning contents to the prepared text, requires teacher's recording for all learning contents, and is biased by teacher's timbre.

To overcome the aforementioned drawbacks of the TDPA approach, the TIPA approach usually adopts speaker-independent speech recognition technology and integrates speech statistical models to evaluate the pronunciation quality for any sentence. It allows adding new learning content. Since the statistic speech recognizer requires acoustic modeling of phonetic units like phonemes or syllables, the TIPA is language dependent. Moreover, the recognition probabilities can't all appropriately justify pronunciation goodness. As shown in FIG. 1 of speech recognition score distribution, phoneme AE ([æ]), AA ([α]), and AH ([Λ]) have very close distribution, though they sound different. Therefore, the probability scoring by speech recognition model is not representative enough to evaluate pronunciation. In addition, the TIPA approach can't provide learners with useful information to learn correct pronunciation through these probability score.

SUMMARY OF THE INVENTION

The present invention has been made to overcome the aforementioned drawbacks of the conventional TDPA and TIPA approaches. The primary object of the present invention is to provide a pronunciation assessment method and system based on distinctive feature analysis.

Compared with the prior arts, this invention has the following significant features. (a) It is based on distinctive feature assessment instead of speech recognition technology. (b) Users could customize this tool with the distinctive feature assessment according to their learning targets. (c) The distinctive feature can be used as the basis for analysis and feedback for correcting pronunciation. (d) The pronunciation assessment is language independent. (e) The pronunciation assessment is text-independent. In other words, users can dynamically add learning materials. (f) Phonological rules for continuous speech can be easily incorporated into the assessment system.

This pronunciation assessment system evaluates a user's pronunciation by one or more distinctive feature (DF) assessors. It may further construct a phone assessor with DF assessors to evaluate a user's phone pronunciation, and even construct a continuous speech pronunciation assessor with the phone assessor to get the final pronunciation score for a word or a sentence. Accordingly, the pronunciation assessment system is organized as three layers: DF assessment, phone assessment, and continuous speech pronunciation assessment. Each DF assessor can be realized differently, and this is based on the different characteristic of the distinctive feature.

A distinctive feature assessor includes a feature extractor, and a distinctive feature classifier. The phone assessor further includes an assessment controller and an integrated phone pronunciation grader. The continuous speech pronunciation assessor further includes a text-to-phone converter, a phone aligner, and an integrated utterance pronunciation grader.

The process for a distinctive feature assessor proceeds as follows. Speech waveform is inputted into the distinctive feature assessor (DFA), and goes through the feature extractor for detecting different acoustic features or characteristics of phonetic distinction. Then, the DF classifier uses the parameters extracted previously as input and computes the degree of inclination of the DF for the input. A score mapper may further be included to standardize the output for each DFA, so that different designs of feature extractor and classifier can produce output of the same format and sense for the result. If the DF classifier output is with the same format and the same sense for all DFs, the score mapper would be unnecessary.

The process for the phone assessor proceeds as follows. The assessment controller identifies phones in the input speech sounds, and dynamically decides to adopt or intensify some DF assessors. Finally, the integrated grader outputs various types of ranking result for the phone pronunciation assessment. Users can also explicitly specify the distinctive features they wish to practice for pronunciation by setting the DF weighting factors.

The process for the continuous speech pronunciation assessor proceeds as follows. Inputs are continuous speech and its corresponding text. The text-to-phone converter converts the text to phone string. Then the phone aligner uses the phone string to align the speech waveform to the phone sequence.

Then by using the phone assessor, the pronunciation assessment system of the invention obtains the score of each phone and integrates them to get the final pronunciation score for a word or a sentence. The DF detection results can be optionally fed back to the phone aligner to adjust the alignment into a finer and more precise segmentation of speech waveform.

The present invention provides a novel and qualitative solution based on the DF of speech sounds for pronunciation assessment. Each speech phone may be described as a "bundle" of DFs. The distinctive features can specify a phone or a class of phones thus to distinguish phones from one another.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 5 shows an experimental result of the classification error rate for GMM classifier according to the present invention.

FIG. 6 shows an experimental result of the classification error rate for SVM classifier according to the present invention.

DETAILED DESCRIPTION OF THE PREFERRED EMBODIMENTS

A distinctive feature is a primitive phonetic feature that distinguishes minimal difference of two phones. The pronunciation assessment system according to the present invention analyzes learner's speech segment to verify whether it conforms to the combination of distinctive features of the correct pronunciation. It builds one or more distinctive feature assessors by extracting suitable acoustic features for each specific distinctive feature. Users could dynamically adjust the weighting of each DFA output in the system to specify the focus of pronunciation assessment. The result from an adjustable phone assessor better corresponds with the goal of language learning. Thereby, the most complete pronunciation assessment system is bottom-up organized as three layers: distinctive feature assessment, phone assessment, and continuous speech pronunciation assessment.

Accordingly, the pronunciation assessment system may comprise one or more DF assessors, or further construct a phone assessor with DF assessors to evaluate a user's phone pronunciation, and even construct a continuous speech pronunciation assessor with phone assessor to get the final pronunciation score for a word or a sentence. Each DF assessor can be realized differently. This is based on the different characteristic of the distinctive feature.

Figure 1:
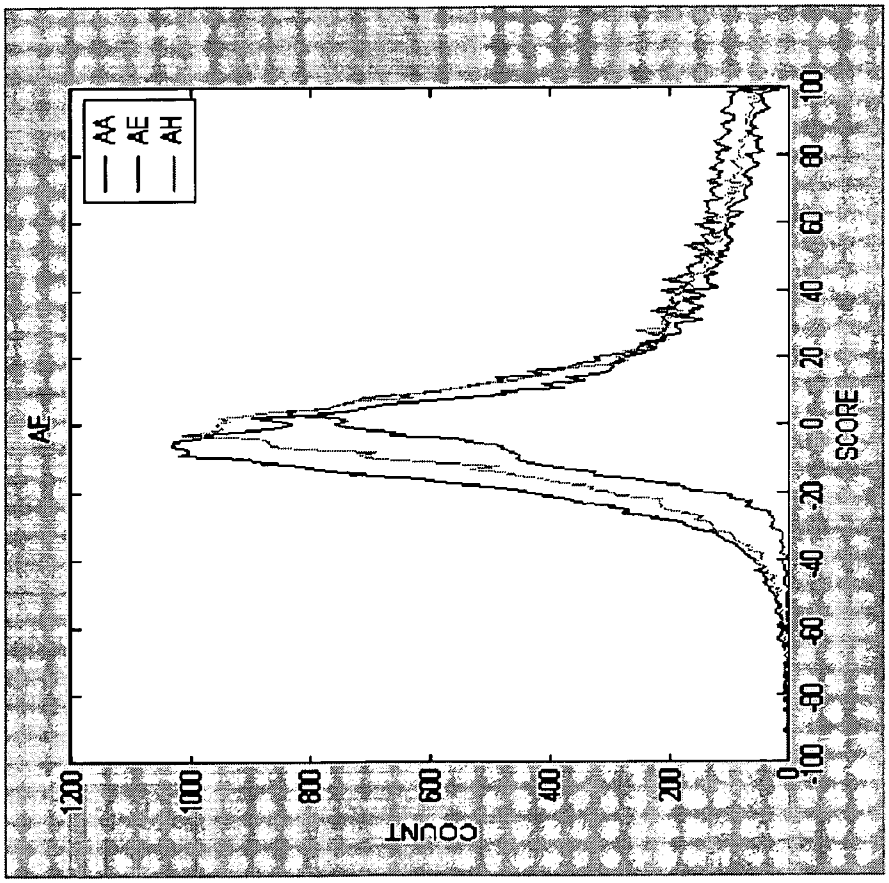
FIG. 1 shows the speech recognition score distribution for phoneme AE, AA, and AH according to a conventional TIPA approach.
Figure 2:
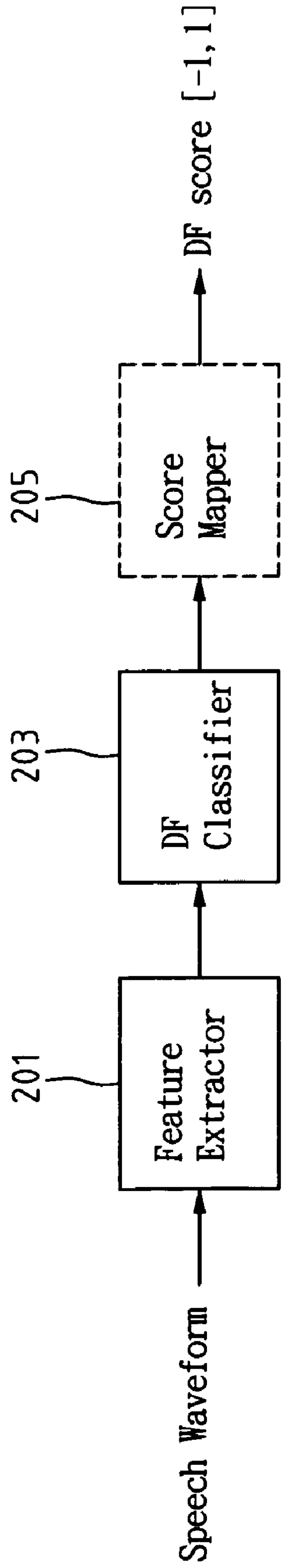
FIG. 2 shows a block diagram of a distinctive feature assessor according to the present invention.

FIG. 2 shows a block diagram of a distinctive feature assessor according to the invention. Referring to FIG. 2, the distinctive feature assessor mainly comprises a feature extractor 201, a DF classifier 203, and a score mapper 205 (optional). Speech waveform is inputted into the distinctive feature assessor, and goes through the feature extractor 201 for detecting different acoustic features or characteristics of phonetic distinction. The DF classifier 203 then uses the parameters extracted previously as input, and computes the degree of inclination of the DF for the input. Finally, the score mapper 205 standardizes the output (DF score) for each DF assessor, so that different designs of feature extractor 201 and classifier 203 can produce output of the same format and sense for the result. The score mapper 205 is designed to normalize the classifier scores to a common interval of values.

The output of a DF assessor is a variable with value, without loss of generality, ranging from −1 to 1. One extreme value, 1, means the speech sound consists of the specified distinct feature with full confidence, −1 means extremely not. The DF score could also be defined as other value range such as [−∞, ∞], [0, 1] or [0, 100]. The followings further describe each part of a DF assessor shown in FIG. 2.

Feature Extractor. The DF can be described or interpreted either in articulatory or in perception point of view. However, for automatic detection and verification of DFs, only acoustic sense of them is useful. Therefore, appropriate acoustic features for each DF must be defined or found out. Different DF can be detected and identified by different acoustic features. Therefore, the most relevant acoustic features could be extracted and integrated to represent the characteristics of any a specific DF.

In the followings, it takes the DFs defined by the linguists as examples. However, the set of DFs may be re-defined from the signal point of view so that the feature extractor can be more straightforward and effective.

Some typical DFs for English include continuant, anterior, coronal, delayed release, strident, voiced, nasal, lateral, syllabic, consonantal, sonorant, high, low, back, round, and tense. There could be more or different DFs that are more effective for phonetic distinction. For example, voice onset time (VOT) could be another important DF for distinguishing several kinds of stops. Different DF can be detected and identified by different acoustic features or characteristics. Therefore, the most relevant acoustic features could be extracted and integrated to represent the characteristics of any specific DF. Some acoustic features are more general that could be used for many DFs. The popular acoustic feature used in conventional speech recognizers, Mel-frequency cepstral coefficients (MFCC), is one apparent example. On the other hand, some features are more specific and can be used particularly to determine some DFs. For example, auto-correlation coefficients may help to detect DFs like voiced, sonorant, consonantal, and syllabic. Some other possible examples of acoustic features include (but not limit to) energy (low-pass, high-pass, and/or band-pass), zero crossing rate, pitch, duration, and so on.

DF Classifier. DF classifier 203 is the core of DFA. First of all, speech corpora for training are collected and classified according to the distinctive feature. Then the classified speech data is used to train a binary classifier for each distinctive feature. Many methods can be used to build the classifier, such as Gaussian Mixture Model (GMM), Hidden Markov Model (HMM), Artificial Neural Network (ANN), Support-Vector Machine (SVM), etc. Using the parameters extracted previously as input, the DF binary classifier computes the degree of inclination of the DF for the input. Different classifiers for different DFs may be designed and deployed so as to minimize the classification error and maximize the scoring effectiveness.

Score Manner. Different classifiers identify different distinctive features with different parameters. Thus, the score mapper 303 is designed to normalize the classifier scores to a common interval of values. For example, the score mapper can be designed as $f(x)=\tanh ax=2/(1+e^{-2ax})-1$ (where a is a positive number), and normalizes the classifier scores from [−∞, ∞] to the common interval [−1, 1]. This is to standardize the output for each DF assessor, so that different designs of feature extractor and classifier can produce output of the same format and sense. This will assure the proper integration of all DF assessors in the next layer.

The score mapper can be bypassed, of course, if the same type of DF classifier is used for all DFs. That is, if the DF classifier output is with the same format and the same sense for all DFs, the score mapper would be unnecessary. Therefore, the score mapper is optional for DF assessor.

Figure 3:
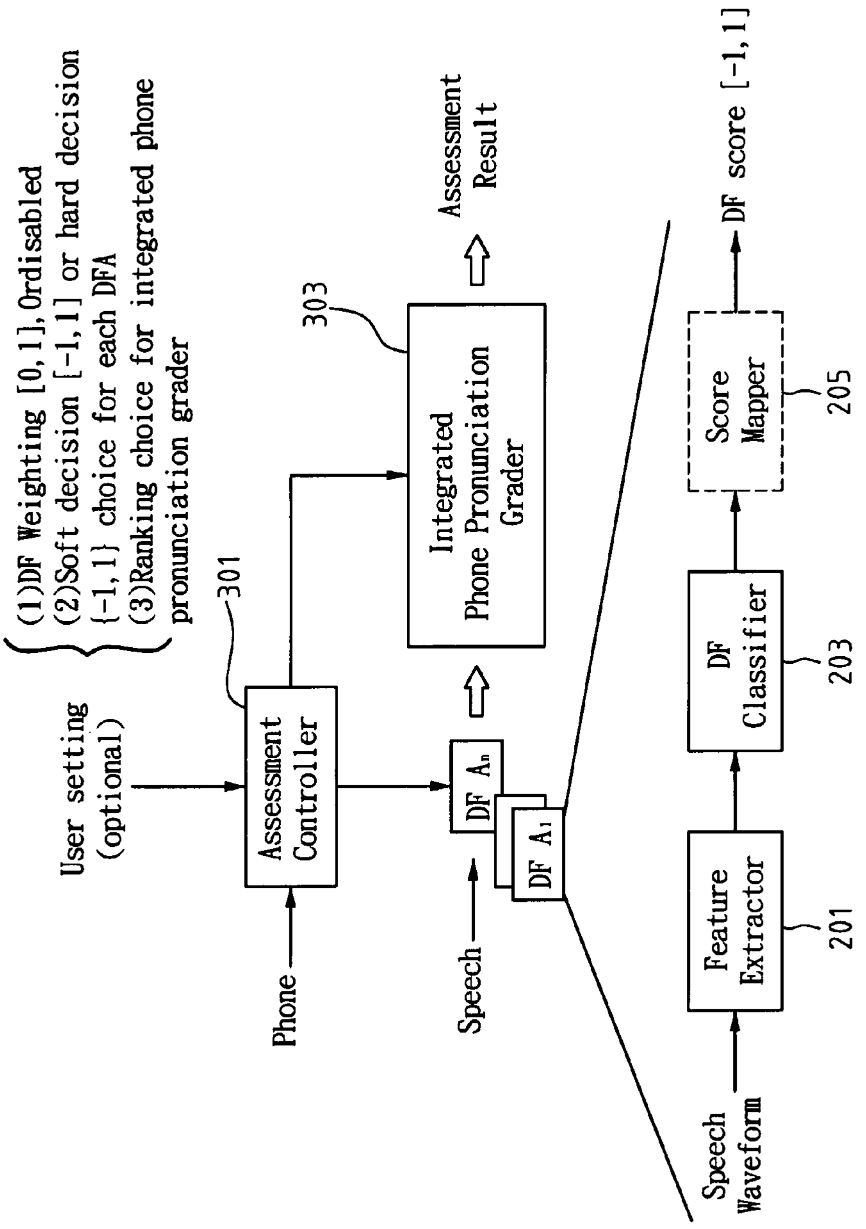
FIG. 3 shows a block diagram of the phone assessor according to the present invention.

The pronunciation assessment system of the invention uses multiple DF assessors to construct a phone level assessment module (layer 2), as shown in FIG. 3. FIG. 3 shows a block diagram of the phone assessor for the pronunciation assessment system according to the present invention. In FIG. 3, the assessment controller 301 identifies phones in the input speech sounds, and dynamically decides to adopt or intensify some DF assessors, $DFA_1$-$DFA_n$. Finally, the integrated phone pronunciation grader 303 outputs various types of ranking result for the phone pronunciation assessment. Users can also dynamically adjust the distinctive features they wish to practice for pronunciation by setting the DF weighting factors (note that value 0 representing specific meaning of disabling the DFA). This may be done by a controller, such as a learning goal controller 405 that will be shown in FIG. 4. The output of each DF can also be chosen between soft decision (that is a continuous value in the interval [−1, 1]) or hard decision (that is binary value −1 and 1). Finally, the integrated phone pronunciation grader 303 can be controlled to output various types of ranking result for the phone pronunciation assessment. It could be an N-levels or N-points ranking result (N>1). It could also be a vector of rankings for several groupings of DFs to express some learning goals.

Figure 4:
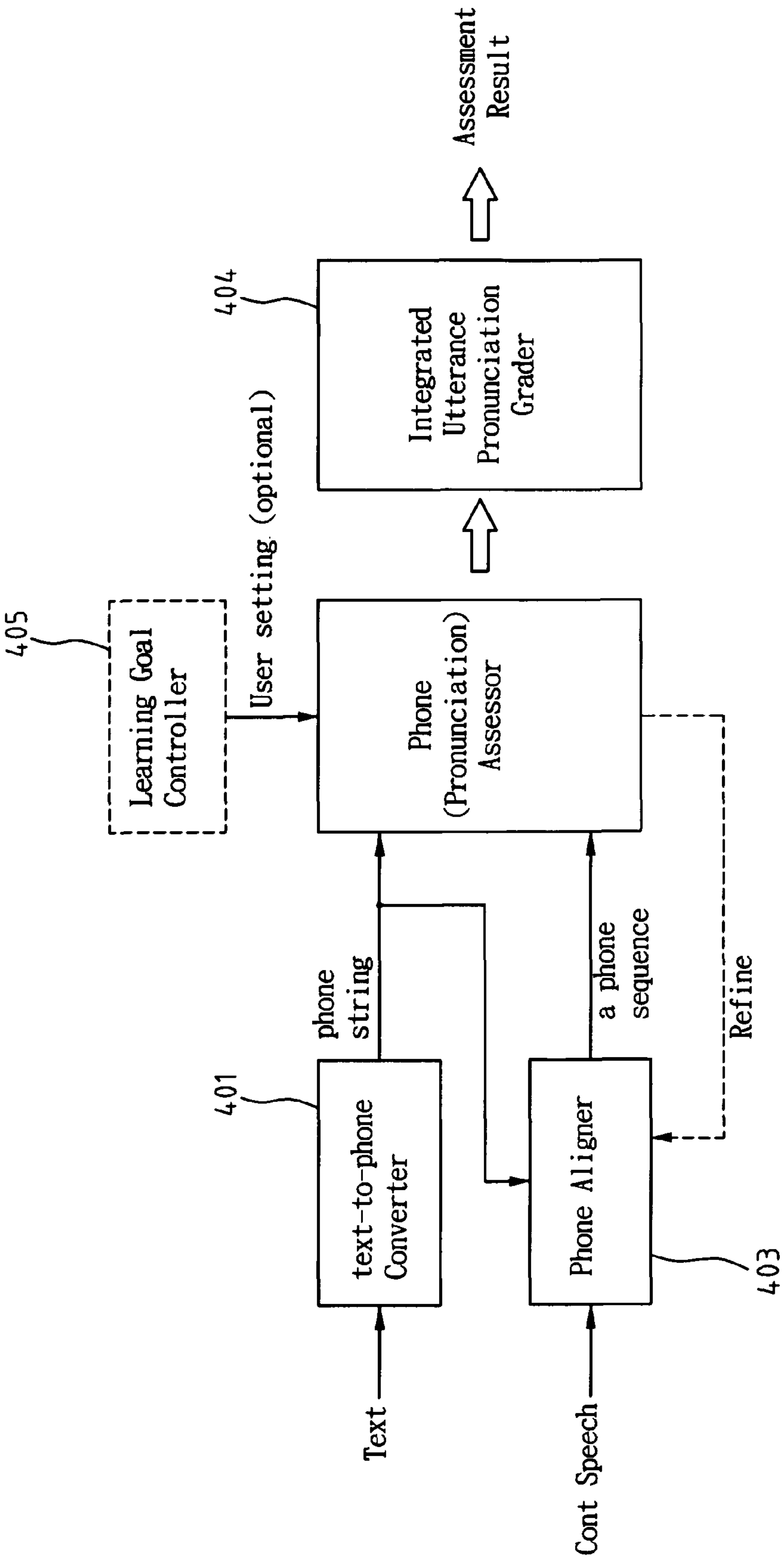
FIG. 4 shows a continuous speech pronunciation assessor according to the present invention.

FIG. 4 shows a block diagram of the continuous speech pronunciation assessor according to the present invention. Referring to FIG. 4, inputs are continuous speech and its corresponding text. A text-to-phone converter 401 converts the text to phone string. The continuous speech pronunciation assessor then uses the phone string to align the speech waveform to a phone sequence of speech segment by a phone aligner 403. Further using the phone (pronunciation) assessor shown in FIG. 3, the pronunciation assessment system obtains the score of each phone, and integrates these scores to get the final pronunciation score for a word or a sentence through an integrated utterance pronunciation grader 404.

It should be noted that the text-to-phone converter 401 can be done by manually prepared information or by computer automatically on-the-fly. Phone alignment can be done by HMM alignment or any other means of alignment. The DF detection results can be optionally fed back to the phone aligner 403 to adjust the alignment into a finer and more precise segmentation of speech waveform.

In an experiment for the invention, 22,000 utterances extracted from the WSJ (Wall Street Journal) corpus were used for the training. The MFCC features were computed and the classifiers of the 16 distinctive features with Gaussian Mixture Model (GMM) were built. For testing purpose, the invention used other 1,385 utterances aside from the training utterances to observe whether the DF assessor could correctly identify the distinctive features. The result of the experiment is shown in FIG. 5. The error rate of the classifying result is 42.75%.

For an alternative method of constructing the classifier, the invention also implemented Support-Vector Machine (SVM). The result of the SVM classifier error rate is 28.87% as shown in FIG. 6. Because each DF assessor can be an independent module, the invention chose the method (GMM or SVM) that gave better performance of each DF assessor. The overall error rate dropped to 25.72%.

In summary, the present invention provides a method and a system for pronunciation assessment based on DF analysis. The system evaluates the user's pronunciation by one or more DF assessors, or a phone assessor, or a continuous speech pronunciation assessor. The output result can be used for pronunciation diagnosis and possible correction guidance. A distinctive feature assessor further includes a feature extractor, a DF classifier, and an optional score mapper. Each DF assessor can be realized differently. This is based on the different characteristic of the distinctive feature.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A pronunciation assessment system for evaluating a user's pronunciation, said pronunciation assessment system comprising: a computer; one or more distinctive feature assessors, each distinctive feature assessor including a feature extractor for extracting acoustic features specific to a corresponding distinctive feature from an input speech waveform, and a distinctive feature classifier for computing degree of inclination of the corresponding distinctive feature based on the extracted acoustic features, and each said distinctive feature assessor being realized according to specific characteristics of the corresponding distinctive feature;

wherein said pronunciation assessment system uses more than one said distinctive feature assessors, an assessment controller and an integrated phone grader to construct a phone assessor and evaluate a user's pronunciation;

wherein said assessment controller identifies phonemes in the input speech waveform and dynamically decides to adopt or intensify some of said distinctive feature assessors, and said integrated phone pronunciation grader outputs various types of ranking result for the phone pronunciation assessment.

2. The pronunciation assessment system as claimed in claim 1, wherein said pronunciation assessment system uses a text-to-phone converter, a phone aligner, said phone assessor and an integrated utterance pronunciation grader to construct a continuous speech pronunciation assessor and evaluate a user's pronunciation.

3. The pronunciation assessment system as claimed in claim 2, wherein the input of said pronunciation assessment system is continuous speech and its corresponding text.

4. The pronunciation assessment system as claimed in claim 3, wherein said text-to-phone converter converts said text to a phone string, and said phone aligner aligns the speech waveform to a phone sequence using said phone string.

5. The pronunciation assessment system as claimed in claim 2, wherein said integrated utterance pronunciation grader integrates the scores of all phones assessed by the phone assessor and gets a final pronunciation score for a word or a sentence.

6. The pronunciation assessment system as claimed in claim 2, wherein said phone assessor feeds distinctive feature detection results back to said phone aligner.

7. The pronunciation assessment system as claimed in claim 2, wherein said text-to-phone converter is done by manually prepared information or by computer automatically on-the-fly.

8. The pronunciation assessment system as claimed in claim 1, wherein each distinctive feature assessor further includes a score mapper to standardize the output for of each said distinctive feature assessor.

9. The pronunciation assessment system as claimed in claim 1, wherein said feature extractor is to detect different features or characteristics of phonetic distinction.

10. The pronunciation assessment system as claimed in claim 1, wherein said distinctive feature classifier is a binary classifier specifically designed and trained for the corresponding distinctive feature.

11. The pronunciation assessment system as claimed in claim 1, wherein the output of a distinctive feature assessor is a variable with value.

12. The pronunciation assessment system as claimed in claim 1, wherein the distinctive features are specified by users.

13. A pronunciation assessment method used in a pronunciation assessment system which evaluates a user's pronunciation, comprising a step of building one or more distinctive feature assessors each said distinctive feature assessor being realized according to specific characteristics of a corresponding distinctive feature; wherein each distinctive feature assessor performs the steps of:

extracting acoustic features specific to the corresponding distinctive feature from an input speech waveform using a feature extractor;

computing degree of inclination of the corresponding distinctive feature based on the extracted acoustic features using a distinctive feature classifier;

wherein said pronunciation assessment method comprises a step of constructing a phone assessor for evaluating a user's pronunciation by using more than one distinctive feature assessors, an assessment controller and an integrated phone grader;

wherein said phone assessor performs proceeds as the following steps: identifying phones in the input speech waveform and dynamically deciding to adopt or intensify one or more distinctive feature assessors by using said assessment controller; and outputting multiple types of ranking result for the phone pronunciation assessment by using said integrated phone grader.

14. The pronunciation assessment method as claimed in claim 13, wherein said distinctive feature classifier is a binary classifier specifically designed and trained for the corresponding distinctive feature.

15. The pronunciation assessment method as claimed in claim 13, wherein each said distinctive feature assessor further performs a step of standardizing the output of each said distinctive feature assessor.

16. The pronunciation assessment method as claimed in claim 13, wherein said pronunciation assessment method further includes a step of generating a final pronunciation score for inputted continuous speech and its corresponding text through a continuous speech pronunciation assessor.

17. The pronunciation assessment method as claimed in claim 16, wherein said continuous speech phone assessor performs the following steps:

(c1) inputting continuous speech and its corresponding text, and converting said text to a phone string;

(c2) using said phone string to align the speech waveform to a phone sequence; and (c3) using said phone assessor to obtain a score for each phone, and integrating said score of each phone to get the final pronunciation score for a word or a sentence.

18. The pronunciation assessment method as claimed in claim 17, wherein at step (c3), the score obtained from said phone assessor is fed back to a phone aligner to adjust phone alignment into a finer and more precise segmentation of speech waveform.

19. The pronunciation assessment method as claimed in claim 15, wherein before the step (b1), a step of user setting is included for dynamically adjusting the distinctive features to specify the focus of pronunciation assessment.

* * * * *